United States Patent [19]

Castellano

[11] Patent Number: 5,009,291
[45] Date of Patent: Apr. 23, 1991

[54] BRAKE PISTON ASSEMBLY

[75] Inventor: Thomas P. Castellano, Malibu, Calif.

[73] Assignee: Industrial Material Technology, Inc., Andover, Mass.

[21] Appl. No.: 206,600

[22] Filed: Jun. 14, 1988

[51] Int. Cl.⁵ .............................................. F16D 65/84
[52] U.S. Cl. .............................. 188/71.6; 188/264 CC; 188/72.4
[58] Field of Search ................... 188/72.4, 72.5, 71.6, 188/264 CC, 264 R, 264 D

[56] References Cited

U.S. PATENT DOCUMENTS

| | | | |
|---|---|---|---|
| 2,254,074 | 8/1941 | Klave | 188/264 CC |
| 2,889,897 | 6/1959 | Sanford et al. | 188/71.6 |
| 4,513,844 | 4/1985 | Hoffman, Jr. | 188/71.6 |
| 4,605,104 | 8/1986 | Thompson | 188/72.5 X |

FOREIGN PATENT DOCUMENTS 2088503  6/1982  United Kingdom ......... 188/264 CC

Primary Examiner—Robert P. Olszewski
Assistant Examiner—Matthew C. Graham
Attorney, Agent, or Firm—Freilich Hornbaker Rosen

[57] ABSTRACT

An actuator is described for a disc brake system of the type which includes a piston whose front end is pressed against a disc by pressured hydraulic fluid that is applied to the rear of the piston and that is prevented from leaking by an elastomeric seal extending around the middle of the piston, which minimizes heating of the seal and hydraulic fluid. The piston is hollow, and has internal walls near its forward end forming a sealed chamber containing sodium. The piston has fins on its outside around the sodium-containing container. A hollow space between the rear wall of the piston and the sodium-filled chamber contains a vacuum. Applicant finds that the temperature rise of the seal and hydraulic fluid is greatly reduced by these arrangements.

7 Claims, 1 Drawing Sheet

BRAKE PISTON ASSEMBLY

BACKGROUND OF THE INVENTION

Disc brake calipers commonly use hydraulically-actuated pistons to press against the disc brakes. The piston can slide in a forward direction within a cylinder under the force of hydraulic fluid, with an elastomeric seal preventing leakage of the fluid. Where the braking system is operated continuously for long periods of time, as in braking an airplane or race car, severe heating becomes an important problem. The heat can boil away the hydraulic fluid and can damage the elastomeric seal. A piston assembly that minimized the temperature rise of the seal and hydraulic fluid, would be of considerable value braking systems of conventional overall design for heavy-duty applications.

SUMMARY OF THE INVENTION

In accordance with one embodiment of the present invention, a hydraulically-actuated brake piston assembly is provided, which minimizes heating of the hydraulic fluid and piston seal. The assembly includes a piston having a rear wall against which hydraulic fluid presses to urge the piston forwardly, a front end that presses against a disc brake element, and a side wall which is sealed to the cylinder within which the piston moves. The piston is hollow along most of its length. A sealed chamber can be provided inside the piston near its front end, with the chamber containing a high thermal capacity material such as sodium. Fins can be provided on the outside of the piston around the sealed chamber. The inside of the hollow piston can be sealed and contain a vacuum. Applicant finds that this arrangement results in reduced temperatures at the rearward portions of the piston where it engages hydraulic fluid and a seal that prevents leakage of the fluid, to avoid damage to either the fluid or the seal.

The novel features of the invention are set forth with particularity in the appended claims. The invention will be best understood from the following description when read in conjunction with the accompanying drawings.

DESCRIPTION OF THE PREFERRED EMBODIMENT

Figure 1:
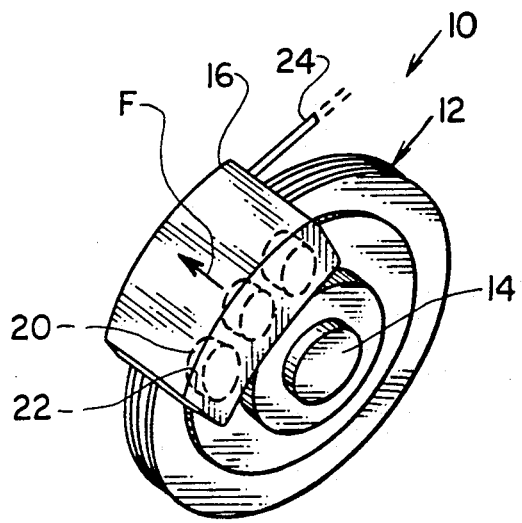
FIG. 1 is a perspective view of a disc brake assembly constructed in accordance with the present invention.

FIG. 1 illustrates a brake assembly 10 which includes a group of disc elements 12 coupled to a shaft 14, and an actuator assembly 16 for braking the disk elements. The actuator assembly includes a group of pistons 20 that move within cylinders 22 under the force of hydraulic fluid received from a conduit 24. As the pistons move in a forward direction F the disc elements are squeezed between opposite sides of the actuator assembly to slow rotation of the shaft.

Figure 2:
FIG. 2 is a partial sectional view of the assembly of FIG. 1.
Figure 2:
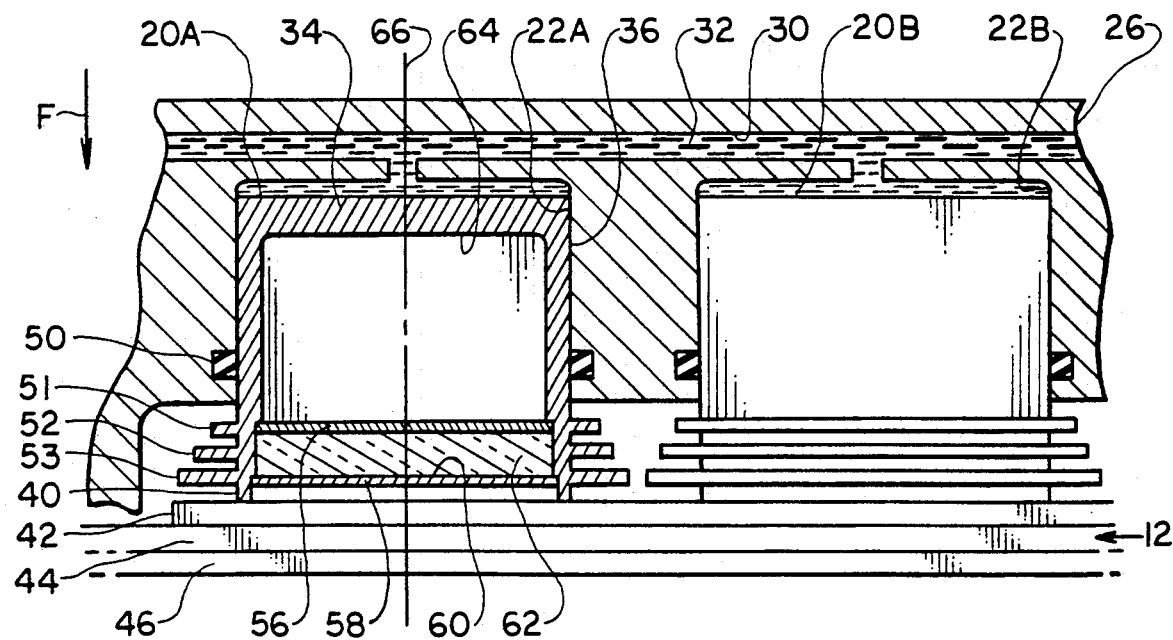

As shown in FIG. 2, the actuator assembly includes a housing 26 in the form of a caliper with passages 30 that carry pressured hydraulic fluid 32 to the cylinders such as 22A, 22B. Each piston such as 20A, 20B has a rear wall 34 against which the hydraulic fluid presses to urge the piston forwardly. Each piston also includes a cylindrical side wall or walls 36 which slide within the corresponding cylinder, and a forward end 40 which presses against one of the disc elements 12. The disc elements, which are each formed of carbon, are arranged in a stack, with a first element 42 against which the piston directly presses. The stack includes additional elements 44, 46, with an element furthest from the first one 42 being fixed to the shaft which is to be braked. Each piston is sealed to the walls of the corresponding cylinder by a ring-shaped seal 50, which prevents pressured hydraulic fluid from leaking in a forward direction past the seal.

When the brake assembly is applied, friction between the brake elements 12 rapidly raises their temperature. In applications such as braking an aircraft that is landing or in the repeated braking of racecars, the disc elements become very hot, with racing car brakes generally glowing red during races, and with temperatures of about 3000° F. being reached. Most parts of the brake system can withstand such high temperatures, but two parts cannot. These parts include the hydraulic fluid 32, which tends to boil away, and the seal 50 which tends to melt at temperatures of about 500° F.

Applicant constructs the pistons with fins 51-53, the fins being located at the forward end 40 of the piston which is the hottest end, to help dissipate heat by air flow across the fins. A pair of forward internal walls 56, 58 are electron beam welded to the cylinder side walls 36 to form a sealed chamber 60 between them. The chamber lies within the cylindrical side walls of the piston at a location forward of the seal 50. A quantity 62 of a coolant material of high specific heat (at least half that of sodium whose specific heat is 0.29 calories per gram per °C), preferably sodium, fills the sealed chamber 60. The sodium-filled chamber 60 lies radially (with respect to the piston axis 66) directly within the fins 51-53. The piston forms a sealed cavity 64 between the sealed chamber 60 and the rear wall 34 of the piston, and this cavity contains a vacuum, preferably less than 10% of atmospheric pressure and less than 1 psi. Applicant applies a vacuum of less than 0.1 psi, which is necessary for electron beam welding of the walls 56, 58. The rear face 56r of the rearmost of the forward internal walls, is of silver color.

Applicant has built a brake system of the type described above and illustrated in the figures using titanium pistons of a diameter of about 1½ inch, and found that the temperature of the seal 50 and hydraulic fluid 32 rose to a much lower temperature than had been previously achieved with a prior braking system operating under the same heavy-duty braking conditions. The prior system was similar except that the pistons were devoid of the sodium-filled chamber 60, and instead were hollow and contained air between the rear wall 34 and the first disc element 42.

Applicant believes that the sodium-filled sealed chamber 60 minimizes the temperature rise at the middle and rear of the piston by first blocking the transfer of heat directly from the hot first brake element 42 to the rear of the piston. If a simple wall were present instead of the sodium-filled chamber, most of such a wall would quickly become heated to almost the same temperature as the first element and it would transmit heat to the rear of the piston. By providing a sodium-filled chamber 60, applicant provides a zone of substantially constant temperature, which is at about the same temperature as the periphery of the piston at the fins 51-53. Applicant also believes that the presence of a vacuum in the cavity 64 between the sodium-filled chamber 60 and the rear portion of the piston, serves to reduce the flow of heat that would otherwise occur by convective air flow in this cavity. Also, the silver rear surface 56r of the internal wall 56 minimizes radiation of heat. Thus, the combination of the sodium-filled chamber 60 which provides a zone of substantially uniform temperature a small distance rearward of the front end of the piston, and especially where the fins 51-53 lie, plus a vacuum cavity 64 between the sodium-filled chamber and the rearward portion of the piston, results in a reduced temperature at the seal 50 and hydraulic fluid 32 during continuous heavy braking and consequent production of high temperatures for an extended period of time at the stack of disc elements of the brake system.

Thus, the invention provides an actuaton assembly for use in a brake system of the type wherein hydraulic fluid presses against the rear of a piston to move its front end against brake disc elements or the like, which minimizes heating of the hydraulic fluid and of a seal that prevents leakage of the fluid. The piston is formed with a sealed chamber spaced from its front end but forward of the seal and hydraulic fluid, the chamber containing a high heat capacity liquid (at the temperatures achieved during heavy braking) such as sodium. The piston has fins directly around the sealed chamber. The inside of the piston forms a cavity between the rear wall of the piston and the sodium-filled chamber, and this cavity contains a vacuum.

Although particular embodiments of the invention have been described and illustrated herein, it is recognized that modifications and variations may readily occur to those in the art and consequently it is intended to cover such modifications and equivalents.

What is claimed is:

1. An actuator apparatus for use in a brake system having a first disc element which is to be pressed against another disc element, comprising:

walls forming a cylinder;
   a piston slideably mounted in said cylinder to move in a predetermined forward direction toward said disc element and in an opposite rearward direction;
   means for applying pressured hydraulic fluid to said cylinder to push said piston in said forward direction;
   a seal between said piston and cylinder for preventing the leakage of said hydraulic fluid;
   said piston having a rear wall against which said hydraulic fluid presses, a substantially cylindrical side wall which seals against said seal, and a forward end that presses toward said disc element;
   said piston also having first and second forward internal walls forming a sealed chamber between them within said cylindrical side wall at a location forward of said seal, and a quantity of a coolant material which is generally a liquid under temperatures reached in braking, lying in said chamber wherein said coolant material has a specific heat at least half that of sodium.

2. The apparatus described in claim 1 wherein:
   said piston has at least one fin extending around said side wall forward of said seal, and said chamber lies directly within said fin.

3. The apparatus described in claim 1 wherein:
   said piston forms a sealed cavity between said rearward internal wall and said rear wall and within said side wall, said sealed cavity containing a vacuum at a pressure less than 10% of atmospheric pressure.

4. An actuator apparatus for use in a brake system having a disc element which is to be pressed against another disc element, comprising:
   means forming a cylinder;
   a piston slideably mounted in said cylinder to move in a predetermined forward direction toward said disc element and in an opposite rearward direction;
   means for applying pressured hydraulic fluid to said cylinder to push said piston in said forward direction;
   seal means for sealing said piston to said cylinder to prevent forward leakage of said fluid;
   said piston having a rear wall against which said liquid presses, a front end which presses against said disc element, side walls connecting said rear wall to said front end, and at least one front internal wall, said piston forming a sealed cavity between said rear and front walls and within said side walls, said cavity containing a vacuum.

5. The apparatus described in claim 4 wherein:
   said piston includes two of said front internal walls, one lying forward of the other, to form a sealed chamber between them, said chamber filled with a coolant;
   said side walls forming at least one fin on the outside of said piston around said chamber.

6. The apparatus described in claim 4 wherein:
   said internal wall has a rear surface which is of silver color.

7. An actuator apparatus for use in a brake system having a first disc element which is to be pressed against another disc element, comprising:
   walls forming a cylinder;
   a piston slideably mounted in said cylinder to move in a predetermined forward direction toward said disc element and in an opposite rearward direction;
   a housing having a passage positioned to carry pressured hydraulic fluid to said cylinder to push said piston in said forward direction;
   a seal between said piston and cylinder for preventing the leakage of said hydraulic fluid;
   said piston having a rear wall against which said hydraulic fluid presses, a substantially cylindrical side wall which seals against said seal, and a forward end that presses toward said disc element;
   said piston having first and second forward internal walls forming a sealed chamber between them within said cylindrical side wall at a location forward of said seal, and a quantity of a coolant material lying in said chamber;
   said piston forms a sealed cavity between the rearwardmost of said internal walls and said rear wall and within said side wall, said sealed cavity containing a vacuum at a pressure less than 10% of atmospheric pressure.

* * * * *